US006831945B1

(12) United States Patent
Lovell et al.

(10) Patent No.: US 6,831,945 B1
(45) Date of Patent: Dec. 14, 2004

(54) METHOD AND APPARATUS FOR REMOTE IDENTIFICATION OF TRANSMISSION CHANNEL INTERFERENCE

(75) Inventors: John Winsor Lovell, Sherborn, MA (US); Warner George Harrison, Medfield, MA (US)

(73) Assignees: Verizon Corporate Services Group Inc., New York, NY (US); Genuity, Inc., Cambridge, MA (US)

( * ) Notice: Subject to any disclaimer, the term of this patent is extended or adjusted under 35 U.S.C. 154(b) by 641 days.

(21) Appl. No.: 09/595,942

(22) Filed: Jun. 16, 2000

(51) Int. Cl.$^7$ ............................. H04B 1/38; H04L 5/16
(52) U.S. Cl. ..................... 375/222; 375/226; 375/316; 375/346; 379/93.01
(58) Field of Search ................................ 375/222, 223, 375/224, 226, 346, 285, 316; 370/465, 463, 351–356; 379/90.01, 400.01, 406.05, 406.8, 406.9

(56) References Cited

U.S. PATENT DOCUMENTS

| | | | |
|---|---|---|---|
| 4,046,964 A | | 9/1977 | Daugherty et al. ............ 179/15 |
| 4,597,089 A | * | 6/1986 | Motley et al. ................ 375/231 |
| 5,048,054 A | * | 9/1991 | Eyuboglu et al. ............ 375/222 |
| 5,297,163 A | * | 3/1994 | Pfeiffer ......................... 375/222 |
| 5,347,539 A | * | 9/1994 | Sridhar et al. ............... 375/222 |
| 5,504,801 A | | 4/1996 | Moser et al. ................... 375/29 |
| 5,615,225 A | | 3/1997 | Foster et al. ................... 379/29 |
| 5,864,284 A | | 1/1999 | Sanderson ............. 340/310.01 |
| 5,917,853 A | * | 6/1999 | Greenblatt ................... 375/222 |
| 5,930,310 A | | 7/1999 | Freeman ...................... 375/346 |
| 5,946,348 A | * | 8/1999 | Mizutani et al. ............. 375/222 |
| 5,991,269 A | | 11/1999 | Williamson et al. ........ 370/241 |
| 5,995,566 A | | 11/1999 | Rickard et al. .............. 375/346 |
| 6,021,158 A | | 2/2000 | Schurr et al. ................ 375/211 |
| 6,035,000 A | | 3/2000 | Bingham ...................... 375/296 |
| 6,192,109 B1 | * | 2/2001 | Amrany et al. ................ 379/30 |
| 6,240,128 B1 | * | 5/2001 | Banerjea et al. ............. 375/222 |
| 6,320,903 B1 | * | 11/2001 | Isaksson et al. ............. 375/232 |
| 6,519,280 B1 | * | 2/2003 | Cole ............................ 375/222 |

OTHER PUBLICATIONS

Albin Johansson, ADSL, Ericsson Review, issue No. 04, 1998.*
Orckit Communications—How does ADSL work, DSL Knowledge Center, from http://www.orcket.com/how_does_ads_works.html.

* cited by examiner

Primary Examiner—Tesfaldet Bocure
Assistant Examiner—Qutub Ghulamali
(74) Attorney, Agent, or Firm—Leonard C. Suchyta, Esq.; Joel Wall, Esq.; Fitzapatrick Cella et al.

(57) ABSTRACT

A method is provided for monitoring transmission signal interference in a bi-directional transmission/reception system in which a modulated signal received at a receiver location is subjected at the receiver location to analog to digital (A/D) conversion by an A/D converter 3, an output of which is routed to an input of a digital demodulator 6 for demodulation. The method includes the steps of accessing the output of the A/D converter 3 before the output is subjected to demodulation by the demodulator 6 and storing the accessed data in a storage buffer 7. The data stored in the storage buffer 7 is available for inspection to assist in determining the presence of signal interference.

28 Claims, 4 Drawing Sheets

METHOD AND APPARATUS FOR REMOTE IDENTIFICATION OF TRANSMISSION CHANNEL INTERFERENCE

BACKGROUND OF THE INVENTION

1. Field of the Invention

The present invention relates to a system and method for obtaining real-time channel condition information on operating DSL (Digital Subscriber Loop) systems, specifically such systems providing high-bandwidth service, and reporting that information for analysis. More generally, the technique of the present invention relates to a method for obtaining and collecting a digital representation of any transmitted analog channel that is subjected to analog to digital conversion at a receiver.

2. Description of the Related Art

Recently, high-bandwidth service has become available over digital subscriber loop (DSL) systems utilizing existing telephone circuits to transmit data to and from subscribers on twisted pair copper telephone lines. Such high-bandwidth service is often referred to as digital subscriber line (also ADSL) service. Hereinafter DSL will be used to refer to the high bandwidth service unless otherwise specified.

FIG. 1 is a block diagram showing a typical DSL deployment to deliver high-speed service in conjunction with POTS (Plain Old Telephone Service). For the sake of simplicity, the figure shows the connection between the central office (CO) 10 and one subscriber 20. Similar connections must be maintained for each subscriber supplied with DSL service.

As shown in the figure, the CO 10 is connected to the Public Switched Telephone Network (PSTN) 40 and also to providers 30 of Internet and Video information. At the CO 10, DSL modem 60 is connected to combiner/splitter 55. Combiner/splitter 55 multiplexes the signal from the modem with the POTS signal from the telephone switch 65, itself supplied by PSTN 40, to supply, over twisted pair line 50, combined downstream POTS and high speed digital service to subscriber 20. The downstream data is received at the subscriber and split, by filtering of the incoming signal, by combiner/splitter 70 at the subscriber into the high-frequency component, which is routed to the subscriber DSL modem 75, and the voice-band (DC-4 kHz) POTS component, which is routed to the subscriber's telephone 80. Upstream data (that is, data from the subscriber to the CO 10) proceeds from the subscriber's computer and telephone in the same manner but in the opposite direction.

FIG. 2 is a block diagram illustrating in somewhat more detail the components of the typical DSL system shown in FIG. 1. Broad-band data content, such as Internet and video, to be transmitted downstream to the subscriber is first supplied to digital modulator 5, a component of the DSL modem located at the service provider, in this case the central office. Today, broad-band data is typically coded as multibit words and modulated onto digital representations of the carrier or carriers in the digital domain, depending on the type of modulation. The signal is then passed through a digital to analog (D/A) converter generating an analog signal for transmission over twisted pair 4. The signal generated is then combined, using combiner/splitter 1, with the telephone signal to produce the complete downstream signal.

At the subscriber side, the received downstream signal is divided by combiner/splitter 1, also known as APOTS splitter, typically by the use of high pass and low pass filters, into the high frequency portion of the signal, containing the broad-band content, and the POTS signal, operating in the voice band. After being split off from the POTS signal and appropriate analog signaling, the downstream broad-band content is routed to an analog to digital (A/D) converter 3. The output of the A/D converter 3 constitutes a digital representation of the broad-band portion of the line signal. The signal output from the A/D converter 3 is then fed to digital demodulator 6, which recovers the coded information bits. Upstream data is transmitted by the subscriber and received by the service provider in much the same manner as the downstream data discussed above, but in the opposite direction.

In twisted pair copper loop networks, such as those illustrated in FIGS. 1 and 2, signals are transmitted in differential mode and any Radio Frequency Interference (RFI) normally will be picked up by both wires of the twisted pair approximately equally with the desired signal being determined by the signal between the wires at the receiver. However, even with such inherent interference-canceling attributes, differential lines still may be subject to occasional electrical interference which can interrupt or degrade service. Such interference is often intermittent and may be caused by licensed services such as Amateur Radio or the Military, or by unlicensed services such as power lines or industrial equipment.

Identification of interference on POTS over twisted pair lines has traditionally been accomplished by manual means or by automated methods which make measurements in the telephone voice frequency band (DC to less than 4000 Hz, and typically 300–3500 Hz). Since this is within the range of human hearing, repair personnel and subscribers can often hear the interfering signals on their telephones.

However, the digital modulation techniques that have been developed to provide high bandwidth DSL service on POTS lines are severely affected by the presence of interference and such interference is much harder to detect in DSL transmissions, as compared to voice-band telephone service, since DSL operates in frequency bands above the audible range. As a result, measurements must be made at higher frequencies, above the traditional telephone frequency band, requiring special equipment.

Further, when interference is intermittent in nature a continuous recording scheme must be used to ensure capture of the event. Such approaches require specially trained repair personnel to visit the customer premises, a practice that is time consuming and expensive.

Some currently available DSL modems, such as the Orckit ORvision modem, purport to utilize a built-in Fast Fourier Transform (FFT) spectrum analyzer that operates continually to measure the signal to noise (S/N) ratio, and report and record these measurements. However, this information is limited to information regarding the demodulated signal, and while access to this information can be indicative of the fact that something is wrong, it does not indicate what it is that is wrong. It would be much more helpful to assist in diagnosing a problem with the line to have access to the digitized line signal, post A/D, but pre-demodulation, that is, a digital representation of the actual voltage conditions on the line itself.

Thus, there exists a need for a technique that allows for continuous remote monitoring of transmitted signals without affecting the normal flow of data and without requiring costly visits by human technicians. There also exists a need for reporting the results of the monitoring without affecting transmission in either the upstream or downstream direction.

SUMMARY OF THE INVENTION

In consideration of the above problems, in accordance with one advantageous aspect of the present invention, a method is provided for monitoring transmission signal interference in a bi-directional transmission/reception system in which a modulated signal received at a receiver location is subjected at the receiver location to analog to digital (A/D) conversion by an A/D converter, an output of which is routed to an input of a digital demodulator for demodulation. The method comprises: accessing the output of the A/D converter before the output is subjected to demodulation by the demodulator; and storing the accessed data in a storage buffer. The data stored in the storage buffer is available for inspection to assist in determining the presence of signal interference.

In accordance with another aspect of the present invention, there is provided a system operable to receive a modulated downstream signal and transmit a modulated upstream signal. The system comprises: a receiving subsystem comprising an analog to digital (A/D) converter that digitizes the received downstream signal, and a demodulator that demodulates the digitized downstream signal; a transmitting subsystem comprising a modulator that modulates upstream data for transmission in the upstream signal and a digital to analog (D/A) converter that D/A converts the modulated upstream data to produce an analog upstream signal; and a channel monitoring and reporting subsystem. The channel monitoring and reporting subsystem comprises: means for accessing the output of the A/D converter; a memory buffer that temporarily stores samples of the accessed output of the A/D converter; and a combining circuit, responsive to receipt of a command or the expiration of a predetermined time interval, that combines data corresponding to the stored samples with the upstream channel data before modulation for transmission.

In accordance with another aspect of the present invention, there is provided a bi-directional communication system for communication between a service provider and a subscriber, the system comprising: (a) a subscriber system operable to receive a modulated downstream signal from the service provider and transmit a modulated upstream signal to the service provider; and a provider system. The subscriber system comprises: a subscriber receiving subsystem comprising a subscriber analog to digital (A/D) converter that digitizes the received downstream signal, and a subscriber demodulator that demodulates the digitized downstream signal; a subscriber transmitting subsystem comprising a subscriber modulator that modulates upstream data for transmission in the upstream signal and a subscriber digital to analog (D/A) converter that D/A converts the modulated upstream data to produce an analog upstream signal; and a subscriber channel monitoring and reporting subsystem comprising: means for accessing the output of the subscriber A/D converter; a memory buffer that temporarily stores samples of the accessed output of the subscriber A/D converter; and a combining circuit, responsive to receipt of a command or the expiration of a predetermined time interval, that combines data corresponding to the stored samples with the upstream channel data before modulation for transmission. The provider system comprises: a provider receiving subsystem comprising a provider analog to digital (A/D) converter that digitizes a received upstream signal from the subscriber, and a provider demodulator that demodulates the digitized downstream signal; a provider transmitting subsystem comprising a provider modulator that modulates downstream data for transmission in the downstream signal and a provider digital to analog (D/A) converter that D/A converts the modulated downstream data to produce an analog downstream signal.

In accordance with yet another aspect of the present invention, there is provided an apparatus for receiving and transmitting modulated signals over a transmission medium and monitoring transmission signal interference occurring over the medium. The apparatus comprises: an analog to digital (A/D) converter for converting incoming modulated signals and outputting a digital representation of the modulated signals; demodulation means for inputting the digital representation of the modulated signals and demodulating the input signals; accessing means for accessing the output of the A/D converter before the output is subjected to demodulation by the demodulation means; and storing means for storing the accessed data in a storage buffer, the data stored in the storage buffer being available for inspection to assist in determining the presence of signal interference.

In accordance with still another aspect of the present invention, there is provided a computer-readable medium storing code for causing a processor-controlled apparatus to perform a method for monitoring transmission signal interference in a bi-directional transmission/reception system in which a modulated signal received at a receiver location is subjected at the receiver location to analog to digital (A/D) conversion by an A/D converter, an output of which is routed to an input of a digital demodulator for demodulation. The method comprises: accessing the output of the A/D converter before the output is subjected to demodulation by the demodulator; and storing the accessed data in a storage buffer, the data stored in the storage buffer being available for inspection to assist in determining the presence of signal interference.

DETAILED DESCRIPTION OF THE PREFERRED EMBODIMENTS

In accordance with a preferred embodiment, the present invention takes advantage of the two existing characteristics of DSL, and many other systems, namely, the A/D conversion that occurs at the receiver before demodulation of a received signal, and the presence of spare bandwidth on the upstream communication channel, to make available timely, on-the-fly, digital voltage samples of the communications channel obtained while the system is in service and without interruption of service.

To implement the remote monitoring capabilities of the present invention, structure is provided, preferably in the subscriber's modem, to permit buffering of the digital output of the A/D converter, pre-demodulation. On-demand access to the contents of the buffer, which contains sampled digital representations of the line signal can be made available to monitoring personnel, equipment, or both, by sending the buffered data along the upstream data channel, taking advantage of the excess bandwidth typically available in the upstream direction. The availability of excess bandwidth is due to the fact that in most applications only short bursts of subscriber data, e.g., a message containing a Uniform Resource Location (URL) for "surfing" the web, or system control signaling, are transmitted upstream.

The sampled digital data can be processed, for example, in both the time and frequency domain using Digital Signal Processing techniques to provide a detailed picture of the interference on a single subscriber's line, or throughout a neighborhood. Sampled data can be used to anticipate problems before they occur allowing remediation prior to the occurrence of service interruptions.

Figure 3:
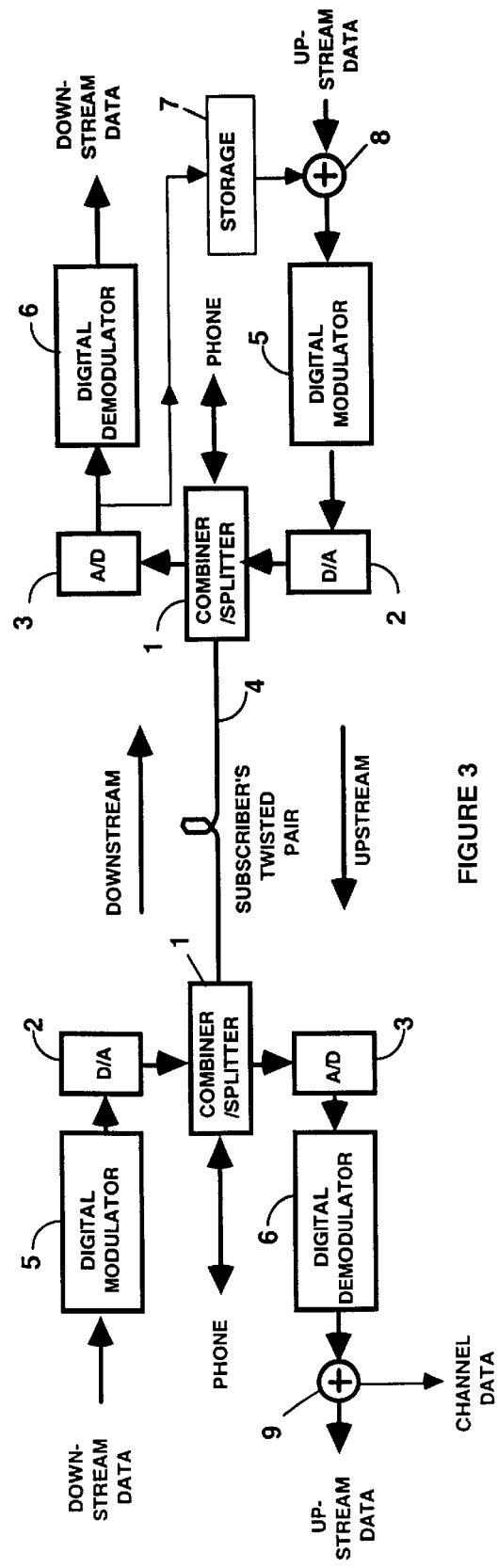
FIG. 3 is a block diagram showing how interference is monitored and reported in accordance with the present invention in a first embodiment.
Figure 4:
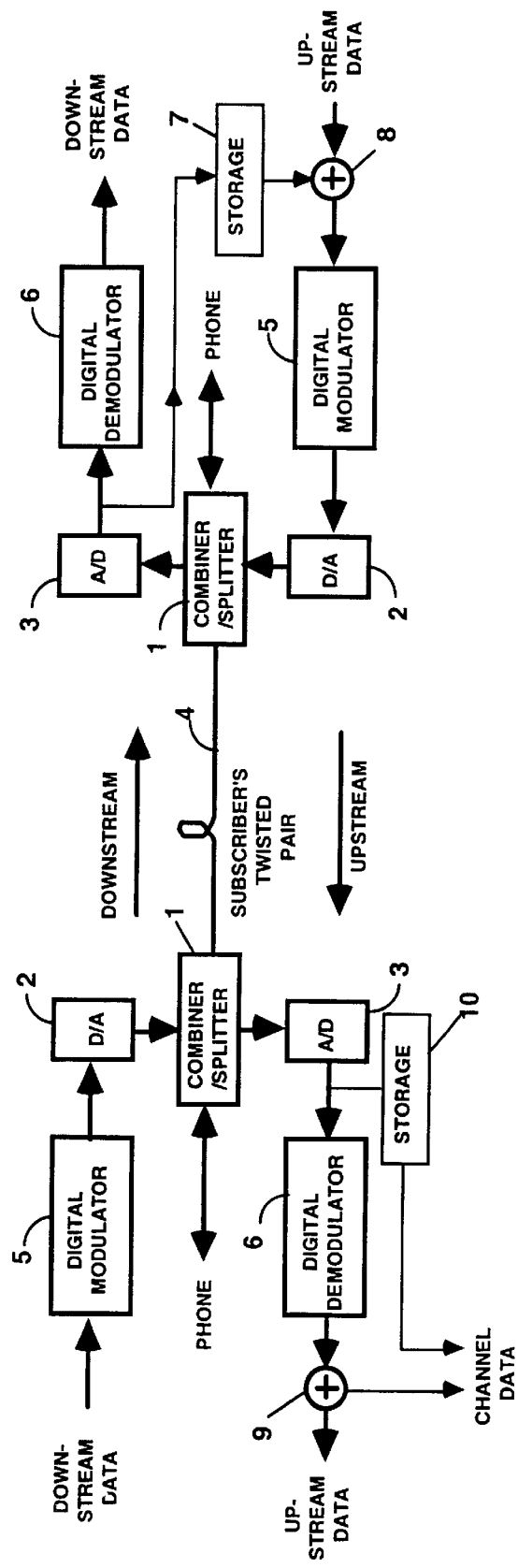
FIG. 4 is a block diagram showing how interference is monitored and reported in accordance with the present invention in a second embodiment.

Details of a preferred embodiment of the invention are illustrated in FIGS. 3 and 4 which show the functionality preferably added to the receiving circuitry to enable that circuitry to perform the functions of the invention. While the invention will be described, for purposes of illustration, as it would be implemented on a DSL system, it will be understood that the technique of the present invention is also applicable to any transmission technique, land-line or broadcast, in which the received signal is sampled by an A/D converter before application of demodulation techniques to retrieve the transmitted data.

Figure 1:
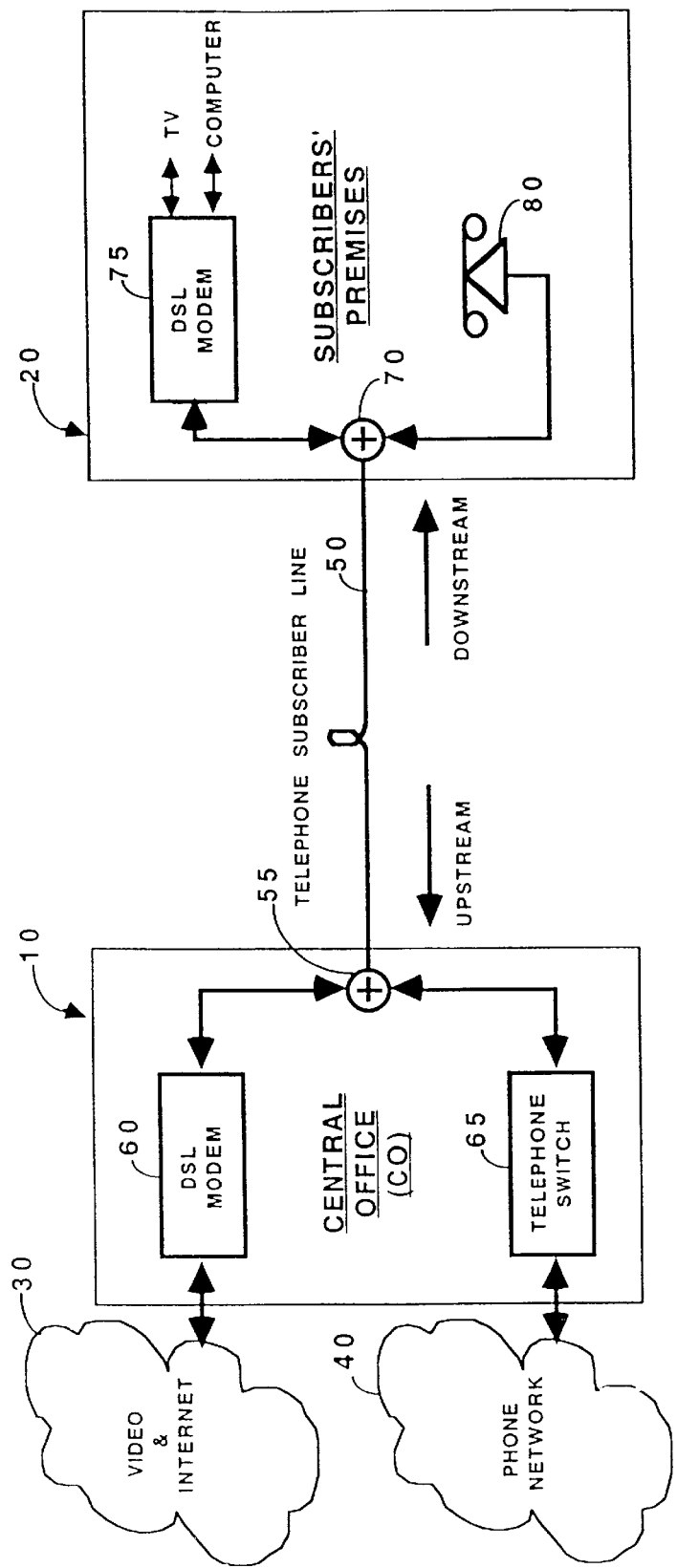
FIG. 1 is block diagram showing a typical DSL deployment using the same twisted pair copper lines for telephone and internet/video.
Figure 2:
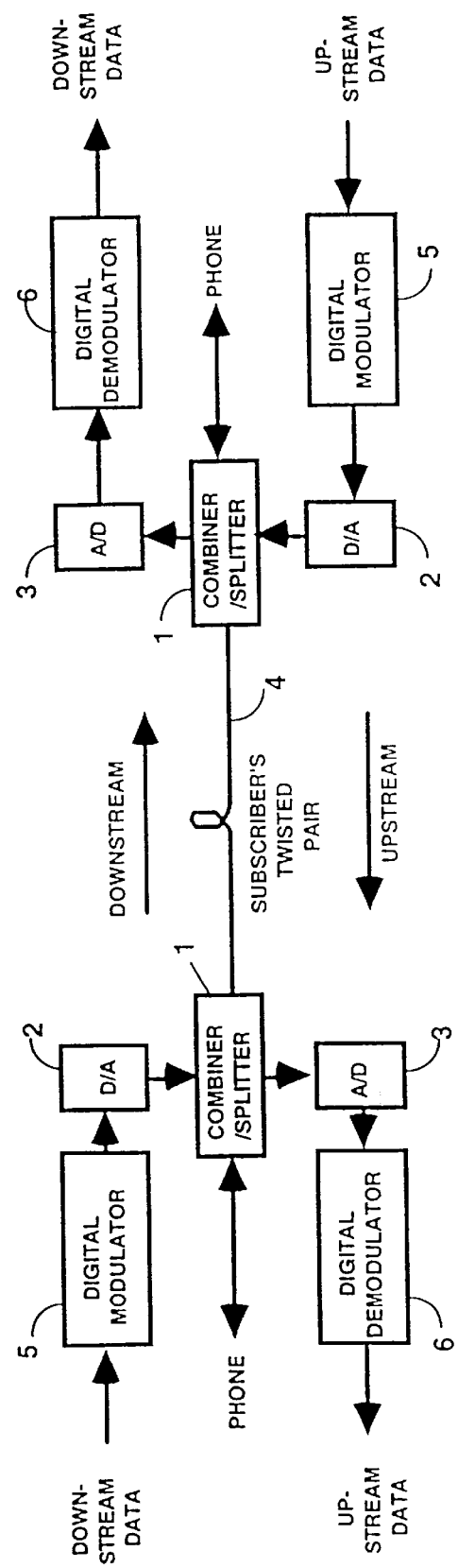
FIG. 2 is a more detailed block diagram showing the components used intypical DSL deployment.

FIG. 3 shows the added functionality that is added to the typical DSL system to enable such a system to utilize the technique of the first embodiment of the present invention. Components that are the same as those appearing in FIG. 2 will be assigned the same reference numerals.

As shown in FIG. 3, in a first preferred embodiment, the received downstream broad-band signal, including any interference or noise on the line, is first split from the POTS signal by the combiner/splitter 1. The separated broad-band signal is then digitized by the A/D converter 3, to produce a digital signal, in preparation for demodulation by the demodulator 6.

In accordance with a preferred embodiment of the present invention, the output signal of the A/D converter 3 is accessed and samples of the accessed signal are then stored in a storage buffer 7, preferably a dedicated memory buffer, or a dedicated location or locations in memory already present in the receiving modem. Accessing the digital signal may be accomplished by connecting dedicated wires from the output lines of the A/D converter 3 directly or indirectly to the buffer 7, the timing of the transfer being controlled in any conventional manner by processing circuitry, not shown.

The present invention is even more preferably implemented by taking advantage of the fact that in typical modem designs, the DSP processor already has access to the data output from the A/D converter before that data is fed to the demodulator and the functionality to store data sampled therefrom in space available in its already existing memory. In such cases, the technique would simply entail additional functionality, implemented in software, to control the modem's DSP processor to sample the digital output and store it to a buffer location in memory in response to a received command or at intervals, or in response to high bit error rates or other conditions.

In either of the above implementations, digital data representing a sample or samples of the condition of the transmission signal is available in the storage buffer 7. To effect remote access to the stored samples requires that the samples be prepared for transmission on the upstream data channel. To achieve this function, on command, or at predetermined intervals, the samples stored in storage buffer 7 are read from the buffer and inserted in the digital upstream data path, pre-modulation, using multiplexer 8, as shown in FIG. 3. Preferably, to avoid interrupting upstream service, this is effected during periods when the upstream data channel is not bursting data.

In preparation for transmission upstream, the output of multiplex 8 is subjected to digital modulation by modulator 5. The output of modulator 5 is then routed to a D/A converter 2, and the resulting signal combined with the upstream POTS signal and transmitted upstream over the subscriber's twisted pair 4, to be received at the service provider. Upon receipt by the service provider, the received upstream data is split by combiner/splitter 1 into the POTS signal component and the broad-band signal component. The separated broad-band signal is routed to A/D converter 3 and then is demodulated by digital demodulator 6. At this point, demultiplexer 9 separates the output of the demodulator 7 into the upstream communication data and the channel condition data that has been piggy-back transmitted for diagnosis. The thus-separated channel condition data can then be forwarded to a central location for signal processing and analysis.

FIG. 4 shows another embodiment of the present invention, that adds, to the invention shown in FIG. 3, the ability to remotely obtain upstream channel condition data using the same technique as is used to obtain downstream data. In this embodiment, the functions with regard to the downstream data are exactly the same as described above with reference to FIG. 3 and will not be repeated.

To provide the ability to monitor the upstream channel conditions, another memory or storage element 10 is added or equivalent memory location dedicated to store sample digital channel data from the output of the upstream A/D converter 3. Just as in the case of the downstream channel data, the data can be analyzed in detail to determine the cause of any problems occurring in transmission. Moreover, just as was the case with the downstream data, the access to the post A/D, pre-demodulator, signal can be obtained by modification of existing circuitry or, if access is already available, under the control of software running on the DSP processor of the service provider's modem.

Note that since the upstream digital path is not nearly as restricted in bandwidth as the analog communications channel, it is possible for the memory to reside in a central facility, rather than in the modem itself.

As has been described in relation to both embodiments of the present invention, added components or functionality provides an interface to the A/D converter output located at a reception point for a transmission channel to be monitored. Further, the present invention provides a technique of storing and forwarding the sampled digitized channel information to a remote location for further processing, in the case of downstream channel information using the available upstream bandwidth for this purpose. The added components or functionality advantageously connect directly to or utilize existing receiving system elements.

While the above description of the preferred embodiments illustrate an advantageous ability to forward channel condition data for analysis at a remote service provider, or at a further remote location in communication with the service provider, the present invention is not limited to this implementation. The accessing of the stored channel condition data can instead be done at the subscriber's premises, or at other locations in the neighborhood of the subscriber to locate and identify interference.

Further, the sampled information can be gathered using either scheduled or unscheduled acquisition of the channel data for processing. Data samples can also be obtained on-the-fly by remote command when system performance indicates a need for channel data. Channel data may be in some embodiments assigned a higher priority than normal upstream data, such as, for example, in video conferencing when the upstream direction may be as loaded as the downstream direction.

Although the embodiments discussed above have been described in the context of modifying a system that is up and running, channel data may be measured using this technique on systems which are not currently in service, allowing analysis for troubleshooting channel problems or assisting in pre-deployment adjustment or planning.

As was discussed above, the present invention provides a channel monitoring technique that is also applicable to any digital communications system that also digitizes the incoming communications channel signal prior to demodulation. Such systems include but are not limited to: Digital HFC (Hybrid Fiber Coax) networks, HPNA (Home Personal Network Architecture), and Digital Wireless Systems such as CDMA, PCS, and GSM.

Although in the preferred embodiments a splitter was needed as the initial receiver stage, the present invention is in no way limited to systems that piggy-back different types of signal, such as the DSL implementation shown in the first and second embodiments. In fact, such a splitter would not be necessary in many transmission techniques for which the present invention would be useful. For example, the present invention can be used to monitor problems in simple voice-band modem systems, since the receiving portion of the voice-band modem may also provide an output of the A/D converter before the digital signal is demodulated. The present invention would also be applicable to ADSL.LITE splitterless ADSL installations.

Further, since the present invention advantageously monitors a digital representation of the line itself, prior to demodulation, it is completely independent of the type of modulation scheme used in the system being monitored. Thus, the present invention can be used regardless of whether the transmission system uses discrete multitone (DMT) modulation, quadrature amplitude modulation (QAM), or carrierless amplitude phase (CAP).

What is claimed:

1. A method for monitoring transmission signal interference in a bi-directional transmission/reception system in which a modulated signal received at a receiver location is subjected at the receiver location to analog to digital (A/D) conversion by an A/D converter, the method comprising:

separately routing an output of the A/D converter to a digital demodulator and to a storage buffer;

demodulating the output of the A/D converter in the digital demodulator to produce downstream data;

storing the output of the A/D converter as data in the storage buffer, the data stored in the storage buffer being available for inspection to assist in determining the presence of signal interference.

2. A method for monitoring transmission signal interference in a bi-directional transmission/reception system in which a modulated signal received at a receiver location is subjected at the receiver location to analog to digital (A/D) conversion by an A/D converter, the method comprising:

routing an output of the A/D converter to a digital demodulator;

demodulating the output of the A/D converter in the digital demodulator to produce downstream data;

accessing the output of the A/D converter before the output is subjected to demodulation by the demodulator; and storing the accessed data in a storage buffer, the data stored in the storage buffer being available for inspection to assist in determining the presence of signal interference, wherein the accessing step is performed responsive to receipt of a sampling command, or is performed at predetermined intervals.

3. A method according to claim 2, further comprising sending, responsive to receipt of a reporting command, or at predetermined intervals, some or all of the stored data to a predetermined location for analysis.

4. A method according to claim 3, wherein the predetermined location is a test unit operated by repair personnel in the vicinity of the receiver location.

5. A method according to claim 3, wherein the predetermined location is remotely located from the receiver location.

6. A method according to claim 3, wherein the data sent during the sending step is combined with an other stream of data to be transmitted from the receiver location.

7. A system operable to receive a modulated downstream signal and transmit a modulated upstream signal, the system comprising:

a receiving subsystem comprising an analog to digital (A/D) converter that digitizes the received downstream signal, and a demodulator that demodulates the digitized downstream signal to produce downstream data;

a transmitting subsystem comprising a modulator that modulates upstream data for transmission in the upstream signal and a digital to analog (D/A) converter that D/A converts the modulated upstream data to produce an analog upstream signal; and a channel monitoring and reporting subsystem comprising:

means for accessing the output of the A/D converter before the output is subjected to demodulation by the demodulator;

a memory buffer that temporarily stores samples of the accessed output of the A/D converter, the samples being available for inspection to assist in determining the presence of signal interference; and a combining circuit, responsive to receipt of a command or the expiration of a predetermined time interval, that combines data corresponding to the stored samples with the upstream channel data before modulation for transmission.

8. A system according to claim 7, wherein accessing of the output of the A/D converter is responsive to a received command or occurs at predetermined intervals.

9. A system according to claim 7, wherein the downstream and upstream modulated signals include digital subscriber line (DSL) signals, the system is located at a DSL subscriber location, the downstream modulated signal originates at a DSL service provider and the upstream modulated signal is transmitted by the system to the DSL service provider.

10. A system according to claim 9, wherein the received downstream signal contains DSL signals and telephone signals multiplexed together and the system further comprises:

a combiner/splitter that:

from the multiplexed downstream channel signal, separates the DSL signal from the telephone signal and routes the DSL signal to the A/D converter and the telephone signal to a subscriber telephone; and combines the upstream modulated channel with outgoing telephone signals to form a multiplexed upstream channel signal.

11. A bi-directional communication system for communication between a service provider and a subscriber, the system comprising:

(a) a subscriber system operable to receive a modulated downstream signal from the service provider and transmit a modulated upstream signal to the service provider, the subscriber system comprising:

a subscriber receiving subsystem comprising a subscriber analog to digital (A/D) converter that digitizes the received downstream signal, and a subscriber demodulator that demodulates the digitized downstream signal to produce downstream data;

a subscriber transmitting subsystem comprising a subscriber modulator that modulates upstream data for transmission in the upstream signal and a subscriber digital to analog (D/A) converter that D/A converts the modulated upstream data to produce an analog upstream signal; and a subscriber channel monitoring and reporting subsystem comprising:

means for accessing the output of the subscriber A/D converter before the output is subjected to demodulation by the demodulator;

a memory buffer that temporarily stores samples of the accessed output of the subscriber A/D converter the samples being available for inspection to assist in determining the presence of signal interference; and a combining circuit, responsive to receipt of a command or the expiration of a predetermined time interval, that combines data corresponding to the stored samples with the upstream channel data before modulation for transmission; and (b) a provider system comprising:

a provider receiving subsystem comprising a provider analog to digital (A/D) converter that digitizes a received upstream signal from the subscriber, and a provider demodulator that demodulates the digitized downstream signal;

a provider transmitting subsystem comprising a provider modulator that modulates downstream data for transmission in the downstream signal and a provider digital to analog (D/A) converter that D/A converts the modulated downstream data to produce an analog downstream signal.

12. A system according to claim 11, wherein accessing of the output of the subscriber A/D converter is responsive to a received command from the service provider or occurs at predetermined intervals.

13. A system according to claim 11, wherein the downstream and upstream modulated signals include digital subscriber line (DSL) signals.

14. A system according to claim 13, wherein the downstream signal contains DSL signals and telephone signals multiplexed together and the subscriber system further comprises:

a subscriber combiner/splitter that:

from the multiplexed downstream channel signal, separates the DSL signal from the telephone signal and routes the DSL signal to the A/D converter and the telephone signal to a subscriber telephone; and combines the upstream modulated channel signal with outgoing telephone signals to form a multiplexed upstream channel signal.

15. A system according to claim 14, wherein the upstream signal contains DSL signals and telephone signals multiplexed together and the provider system further comprises:

a provider combiner/splitter that:

from the multiplexed upstream channel signal, separates the DSL signal from the telephone signal and routes the DSL signal to the A/D converter and the telephone signal to a public switched telephone network (PSTN); and combines the downstream modulated channel signal with outgoing telephone signals from the PSTN to form a multiplexed downstream channel signal.

16. A system according to claim 15, the provider system further comprising:

a provider channel monitoring and reporting subsystem comprising:

means for accessing the output of the provider A/D converter; and a memory buffer that temporarily stores samples of the accessed output of the provider A/D converter.

17. An apparatus for receiving and transmitting modulated signals over a transmission medium and monitoring transmission signal interference occurring over the medium, the apparatus comprising:

an analog to digital (A/D) converter for converting incoming modulated signals and outputting a digital representation of the modulated signals;

routing means for separately routing the digital representation to:

demodulation means for receiving the digital representation of the modulated signals and demodulating the received signals to produce downstream data;

storing means for storing digital representation as data, the data stored in the storing means being available for inspection to assist in determining the presence of signal interference.

18. An apparatus for receiving and transmitting modulated signals over a transmission medium and monitoring transmission signal interference occurring over the medium, the apparatus comprising:

an analog to digital (A/D) converter for converting incoming modulated signals and outputting a digital representation of the modulated signals;

demodulation means for inputting the digital representation of the modulated signals and demodulating the input signals to produce downstream data;

accessing means for accessing the output of the A/D converter before the output is subjected to demodulation by the demodulation means; and storing means for storing the accessed data in a storage buffer, the data stored in the storage buffer being available for inspection to assist in determining the presence of signal interference, wherein operation of the accessing means is responsive to receipt of a sampling command, or is performed at predetermined intervals.

19. An apparatus according to claim 18, further comprising sending means for sending, responsive to receipt of a reporting command, or at predetermined intervals, some or all of the stored data to a predetermined location for analysis.

20. An apparatus according to claim 19, wherein the predetermined location is a test unit operated by repair personnel in the vicinity of the apparatus.

21. An apparatus according to claim 19, wherein the predetermined location is remotely located from the apparatus.

22. An apparatus according to claim 19, wherein the data sent by the sending means is combined with other data to be transmitted from the apparatus.

23. A computer-readable medium storing code for causing a processor-controlled apparatus to perform a method for monitoring transmission signal interference in a bi-directional transmission/reception system in which a modulated signal received at a receiver location is subjected at the receiver location to analog to digital (A/D) conversion by an A/D converter, the method comprising:

separately routing an output of the A/D converter to a digital demodulator to and to a storage buffer;

demodulating the output of the A/D converter in the digital demodulator to produce downstream data;

storing the output of the A/D converter as data in the storage buffer, the data stored in the storage buffer being available for inspection to assist in determining the presence of signal interference.

24. A computer-readable medium storing code for causing a processor-controlled apparatus to perform a method for monitoring transmission signal interference in a bi-directional transmission/reception system in which a modulated signal received at a receiver location is subjected at the receiver location to analog to digital (A/D) conversion by an A/D converter, the method comprising:

routing an output of the A/D converter to a digital demodulator;

demodulating the output of the A/D converter in the digital demodulator to produce downstream data;

accessing the output of the A/D converter before the output is subjected to demodulation by the demodulator; and storing the accessed data in a storage buffer, the data stored in the storage buffer being available for inspection to assist in determining the presence of signal interference, wherein the accessing step is performed responsive to receipt of a sampling command, or is performed at predetermined intervals.

25. A computer-readable medium according to claim 24, the method further comprising sending, responsive to receipt of a reporting command, or at predetermined intervals, some or all of the stored data to a predetermined location for analysis.

26. A computer-readable medium according to claim 25, wherein the predetermined location is a test unit operated by repair personnel in the vicinity of the receiver location.

27. A computer-readable medium according to claim 25, wherein the predetermined location is remotely located from the receiver location.

28. A computer-readable medium according to claim 25, wherein the data sent during the sending step is combined with other data to be transmitted from the receiver location.

* * * * *